UNITED STATES PATENT OFFICE.

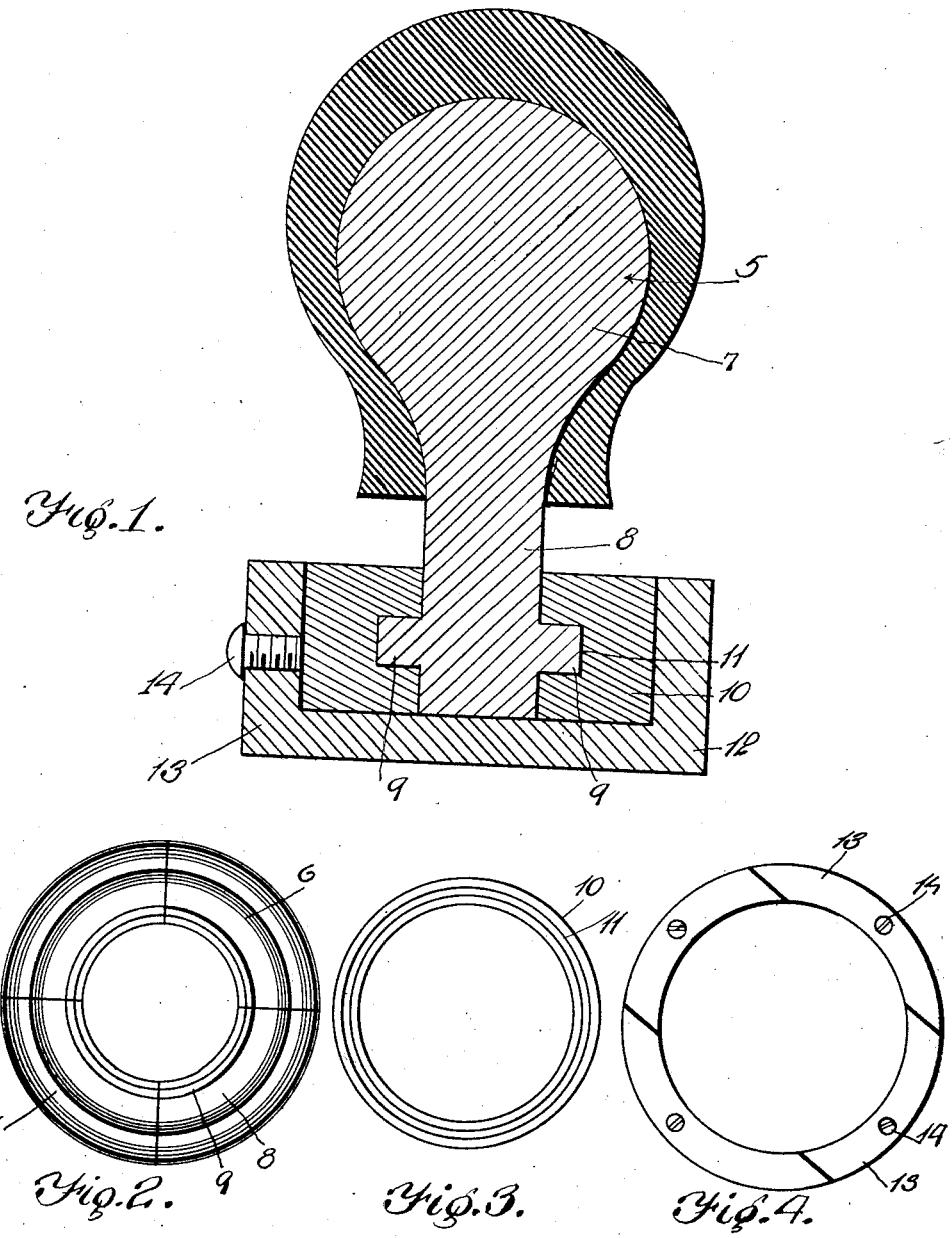

ERIC A. ERICSON, OF AKRON, OHIO.

CLAMP FOR TIRE-CORES.

1,360,736. Specification of Letters Patent. Patented Nov. 30, 1920.

Application filed September 8, 1919. Serial No. 322,486.

*To all whom it may concern:*

Be it known that I, ERIC A. ERICSON, a citizen of the United States, residing at Akron, in the county of Summit and State of Ohio, have invented certain new and useful Improvements in Clamps for Tire-Cores, of which the following is a specification.

My invention relates to improvements in cores employed in building and curing pneumatic tires, and relates more particularly to means for holding the sections of such a core together to allow of their removal from the tire when desired.

An important object of the invention is to provide a device of the above mentioned character which is simple in construction, inexpensive to manufacture, strong, durable, and convenient in use.

Other objects and advantages of the invention will be apparent during the course of the following description.

In the accompanying drawings, forming a part of this specification and in which like numerals are employed to designate like parts throughout the same, Figure 1 is an enlarged transverse sectional view through a device embodying my invention, Fig. 2 is a side elevation of the core, upon a reduced scale, Fig. 3 is an inner side elevation of a holding ring, and, Fig. 4 is a side elevation of the locking ring.

In the drawings, wherein for the purpose of illustration is shown a preferred embodiment of my invention, the numeral 5 designates the core as a whole, formed in segmental sections 6. Each core section embodies a body portion 7, and radial shank 8, which is provided upon its opposite sides with longitudinal curved outwardly extending flanges 9. The flanges 9 of the several core sections constitute an annular flange, upon each side thereof.

The numeral 10 designates holding rings, provided upon their inner sides with annular grooves 11 receiving the flanges 9. The rings 10 are formed integral and are not made in sections.

The numeral 12 designates a locking ring, which is U-shaped in cross-section, adapted for the reception of the assembled shank and rings 10. This locking ring is formed in sections 13, which are adapted to be removed from the rings 10, each section being clamped thereto by a screw or bolt 14, as shown.

In assembling the different parts of the apparatus, one ring 10 is placed upon a horizontal support with its annular groove 11 arranged uppermost and the core sections 6 are now placed upon this ring 10, in an annular group, the flanges 9 entering the grooves 11. The other ring 10 is now positioned upon the shank of the core sections, and receives the upper flange 9. When thus assembled, the locking ring sections 13 are placed upon the assembled rings 10, as is obvious, these locking rings being clamped thereto by the screws or bolts 14. The core may now be employed in the building of the pneumatic tire 15. When it is desired to remove the core from the same, the ring sections 13 are first removed, and the holding rings 10 are separated from the shanks 8. The core sections may now be moved inwardly with relation to the tire 15 for disengagement therewith.

While I have shown a core of solid construction, it is to be understood that I do not limit myself to this construction as any form of core may be used, as for instance, the common pneumatic core.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In apparatus of the character described, a plurality of core sections having inwardly extending shanks provided upon opposite sides with curved flanges, holding rings having grooves to receive the flanges, a plurality of locking ring sections formed approximately U-shaped in cross-section for receiving the holding rings, and means to clamp each locking ring section in position upon the holding rings.

2. In apparatus of the character described, a plurality of core sections having inwardly extending shanks provided upon opposite sides with curved flanges, holding rings having grooves to receive the flanges, a plurality of locking ring sections formed approximately U-shaped in cross-section for receiving the holding rings, and threaded bolts arranged in openings in said locking ring sections, and engaging one of said holding rings to clamp said locking ring sections upon the holding rings.

In testimony whereof I affix my signature in presence of two witnesses.

ERIC A. ERICSON.

Witnesses:
JOHN C. FRANK,
BERTHA SIMON.